United States Patent Office 3,102,204
Patented Aug. 27, 1963

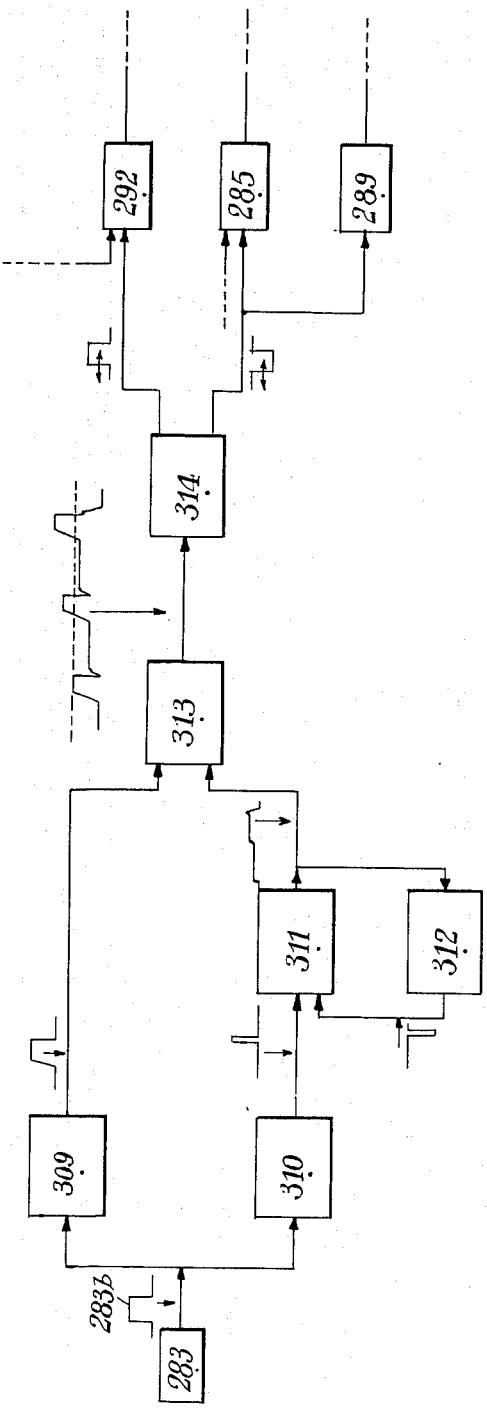

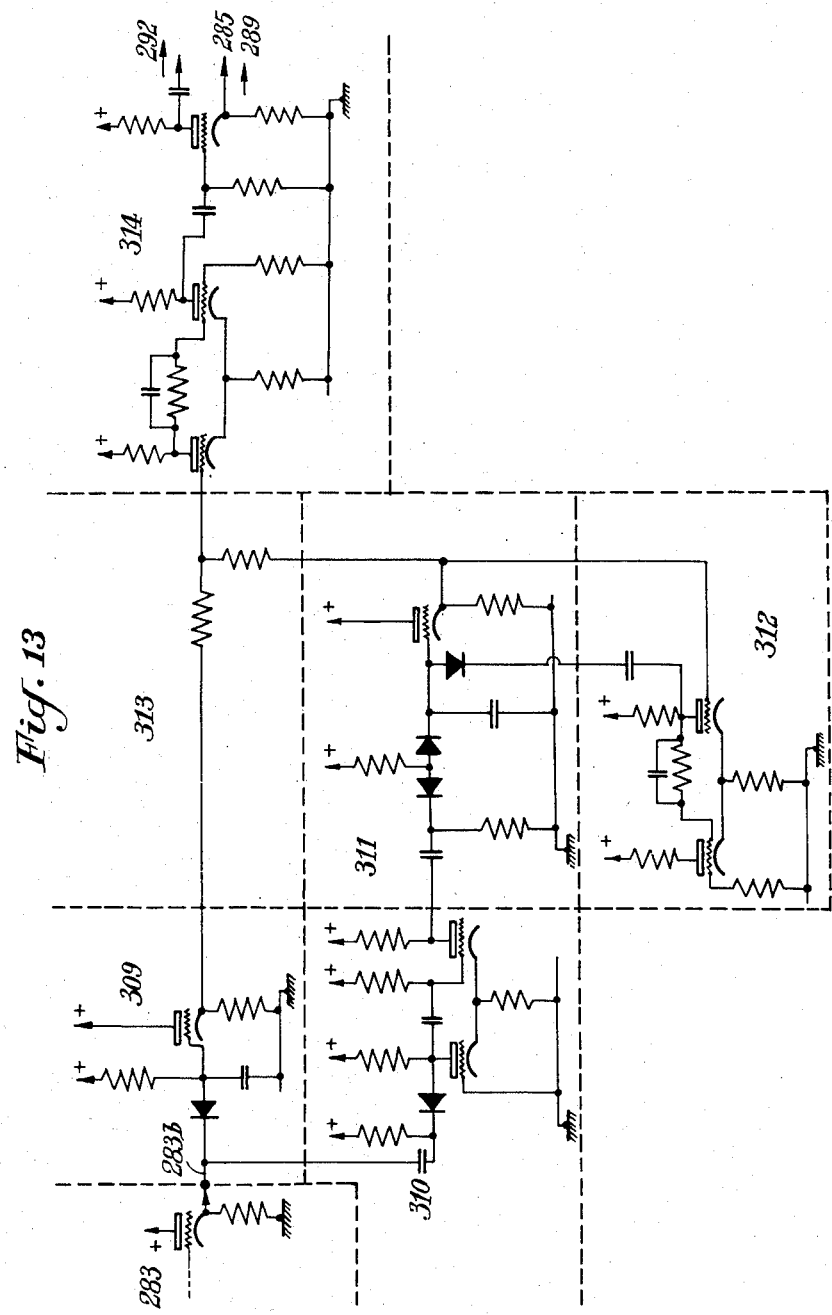

3,102,204
PHOTOSENSITIVE APPARATUS FOR MEASURING THE TRANSVERSE DIMENSIONS OF WIRES AND CABLES
Oscar Henri Ingber, 15 Blvd. du General Koenig, Neuilly-sur-Seine, France
Filed May 31, 1960, Ser. No. 32,982
Claims priority, application France May 29, 1959
14 Claims. (Cl. 250—219)

The present invention relates to an apparatus for measuring the transverse dimension, that is, the apparent width or diameter, of tapes, wires or cables, tubes, bars, etc. to which a relatively fast motion in the axial or longitudinal direction is impressed and which may be at the same time the seat of transverse vibration. More particularly, this device is suitable for measuring the diameter of metal wires, tubes or cables during their manufacture with a view to maintain their dimensions to constant or predetermined values by means of adequate corrections applied or controlled either manually or automatically by the apparatus itself. Actually, the high speed at which the articles to be measured are driven (the following description referring only to wires or tapes taken by way of example and representing any other object adapted to be measured by means of the apparatus of this invention) renders inadequate the conventional method of measuring their dimension by means of a mechanical feeler causing the displacement of a pointer through mechanical, hydraulic or pneumatic control means, since this feeler would be subject to rebounds and might detrimentally affect by its pressure the shape of the object to be measured, during certain steps such as the setting of a plastic cable sheath or the like.

It is the essential object of this invention to provide an apparatus for effecting the measurement of the transverse dimension of an object of elongated shape with a very high degree of precision, and without the assistance of any mechanical feelers.

It is another object of the apparatus of this invention to give a precise indication of the statistical overstepping, that is, the integration of the measurement of the local overstepping with respect to a predetermined limit of the dimension of the measured object.

Another object of the invention is to provide means for giving a mean value of the measured local dimension during the passage of the object measured.

Another object of the invention is to provide means to establish a differential voltage between that representing the mean value of the local dimension measured and another regulable voltage constituting a "standard" that one desires to impose as the said mean value during the manufacture of the object measured, said differential voltage being utilized to control the machine manufacturing this object so as to reset automatically the mean value of its dimension corresponding to that of said "standard."

Another object of the invention is to provide means establishing voltages proportional to "statistical overstepping" of the local dimensions of the object in relation to a pre-adjusted "critical limit or dimension."

Another object of the invention is to provide means establishing a differential voltage between that representing the value of the "statistical overstepping" and another regulable voltage constituting a "standard" that one desires to impose as the measure of the "statistical overstepping" during the manufacture of the object measured, said differential voltage being utilized to drive a member regulating the value of the "standard" of the mean diameter set forth above so as to reset the value of the "statistical overstepping" to the value of the "standard" of this "statistical overstepping."

Other objects and a fuller understanding of the invention may be had by referring to the following description and claims, taken in conjunction with the accompanying drawings in which:

FIGURE 12 is a block diagram illustrating another form of embodiment of the apparatus.

FIGURE 13 is a wiring diagram of the modified embodiment shown in FIG. 12.

Figure 1:
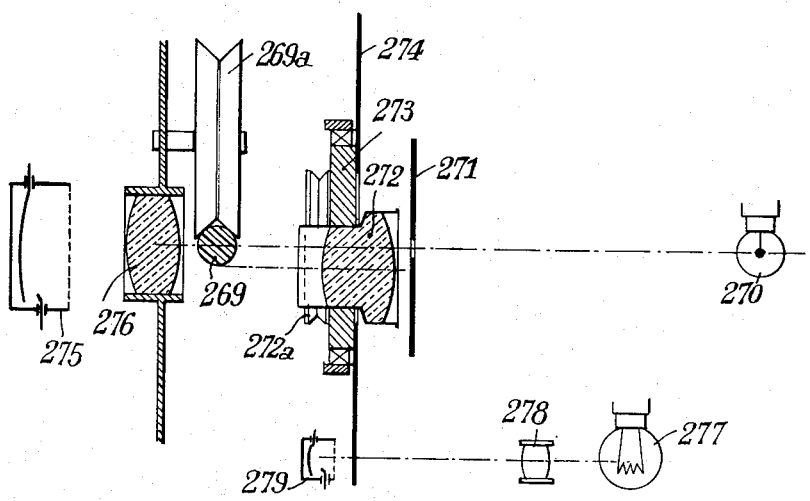
FIGURE 1 is a diagrammatic sectional view showing a typical form of embodiment of an apparatus constructed according to the teachings of this invention.

The apparatus according to this invention, as shown in FIG. 1, comprises a light source consisting of a bulb 270 having a straight and fine filament parallel to the wire 269 of which the transverse dimension, that is, the thickness, is to measured. The apparatus further comprises a lens system 272 mounted eccentrically on a support 273 rotatably driven from a pulley 272a. Disposed between the lens system 272 and the light source 270 is a slit-type diaphragm having the function of increasing the field depth. The support 273 of lens system 272 is on the other hand solid with a disc 274 formed with a series of narrow radial peripheral slots 274a of a width of which the relative spacing varies according to a specific trigonometric law in order to meet a requirement to be set forth presently.

The flux transmitted through the lens 272 is partially blocked by the wire 269 (guided by pulleys such as 269a), the filament image being formed on the plane of this wire, whereafter the remaining flux illuminates the photoelectric cell 275 through an optical system 276.

An auxiliary lamp 277 illuminates through a lens 278 the marginal portion of the disc 274 and an auxiliary cell 279.

During the lens rotation the image of the filament of lamp 270 describes a circle and is blocked twice by the wire 269. During each interception the photoelectric current in cell 275 is broken between two moments and during the time lapse the photoelectric pulses from the auxiliary cell 279 are transmited through the medium of a gate as will be explained presently. The number of these pulses increases with the width of the wire or cable to be measured.

The relative spacing of the slots 274a of disc 274 is such that when the wire moves at right angles to the optical axis of the device the number of pulses thus transmitted remains constant.

Figure 3:
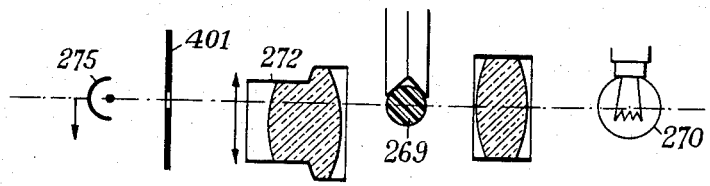
FIGURE 3 is a diagram illustrating a modified embodiment of the apparatus.

According to a modified embodiment (FIGURE 3) a similar effect could be obtained by displacing the image of one portion of the field illuminating the object 269 to be measured in front of a fixed diaphragm 401 (also in the form of a narrow slit) located in front of a photoelectric cell such as 275, for example by applying an alternating motion to the optical system 272. The means for effecting and utilizing this displacement, notably by deflecting the optical beam and using reference signals, are very similar to those proposed hereinafter for effecting and utilizing the displacements of light spots.

Figure 4:
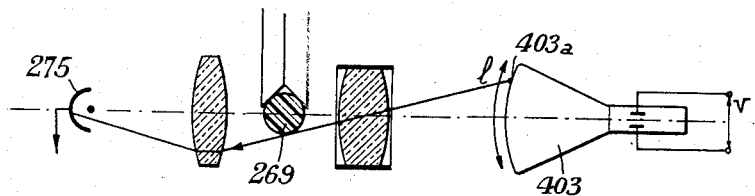
FIGURE 4 is a diagram illustrating another modification of the apparatus of this invention.

According to other modifications still within the purview of this invention, the light spot scanning the object may be formed (FIG. 4) by the spot 403a of a cathode ray tube 403 of the flying spot type.

If desired, the displacement of the light spot or spots, instead of being circular, may be linear, elliptic, or other, and an oscillatory movement may be substituted for the continuous rotation, provided that the path of the light spot or spots strikes the object to be measured.

Figure 5:
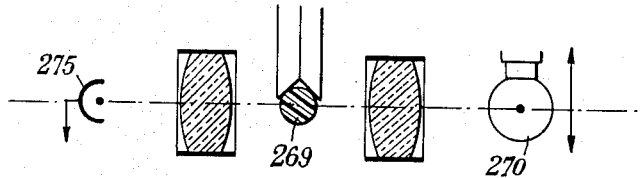
FIGURE 5 is a diagrammatic illustration of another embodiment of the apparatus.
Figure 6:
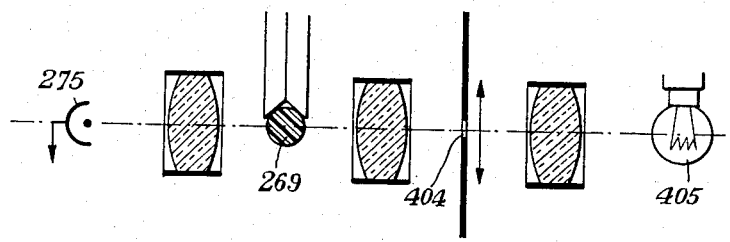
FIGURE 6 is a diagram showing an alternate embodiment of the apparatus of this invention.
Figure 7:
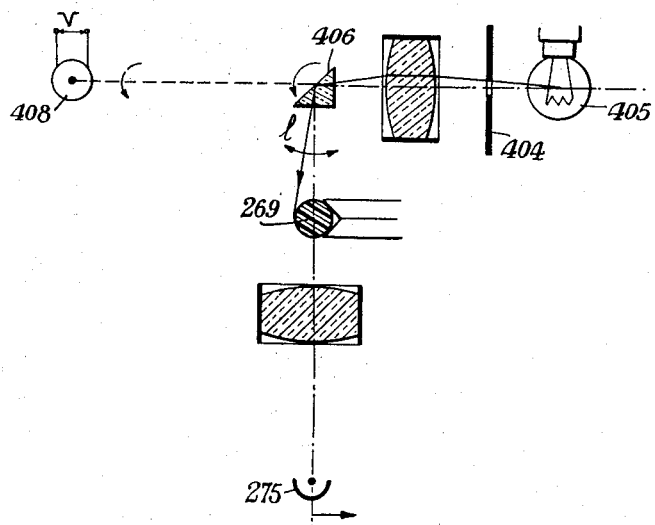
FIGURE 7 is a diagram concerning a further embodiment.
Figure 8:
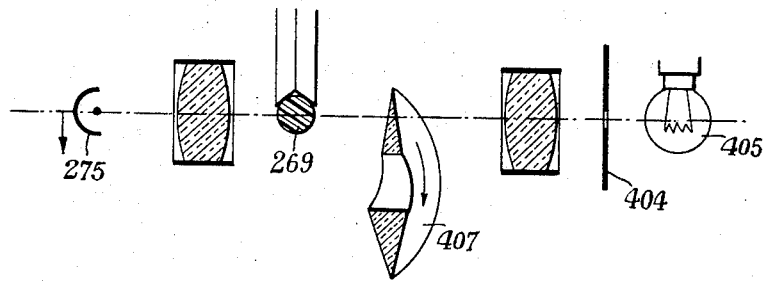
FIGURE 8 shows in diagrammatic form a modified embodiment of the apparatus.

The displacement may be obtained by cyclically driving, as a substitute for the optical system 272, the light source (lamp 270 of FIG. 5), or a slit 404 illuminated by an incandescent lamp 405 (FIG. 6) and forming an image on the object 269. If desired, an intermediate light deflector 406 (FIG. 7) such as a total-reflection mirror or prism to which a motion of rotation or oscillation is imparted from a motor 408, may be used. The desired effect may be obtained for example by rotating a light source or a slitted diaphragm, a Wollastonian prism, a beam-deflecting prism or mirror of which the perpendicular to its surface forms a relatively small angle with the axis of rotation. This displacement may also be obtained by oscillating a deflection mirror, the lens or the source itself, the movement being impressed by any suitable electric means. Furthermore, this displacement may be obtained by rotatably driving a ring 407 (FIG. 8) constituting a curved prism or mirror of which one portion causing the deflection of the light beam is so shaped that the inclination of the plane tangent to its surface varies along the circumference.

If the displacement of the light spot is uniform an electric voltage proportional to the discrepancy between its positions at the beginning and at the end respectively of its interception by the object to be measured may be obtained by integrating between these two moments the deflection currents of a flying spot tube, or by the electrical opposition of the voltages resulting from the integration of these currents or simply from those of the electrostatic deflection between these two moments, or furthermore, by a similar operation applied to the feed voltages of either the rotary or oscillating motors driving the light spot deflecting member, or the generators driven thereby, this mode of operation being obtained for example by using gates responsive to or controled by the photoelectric signal or its derivative.

In the case of a non-uniform displacement (according to the direction of the measurement) of the light spot, an auxiliary member driven or synchronized by the light-beam deflecting member may be used to constitute a continuous or discontinuous auxiliary reference signal varying linearly (or of which the integral varies linearly) with the displacement of the light spot according to the direction of the dimension to be measured. This permits the application of the above-defined method utilizing one or two gates actuated during the entire time period in which the photoelectric signal is blocked or intercepted, or only at the beginning or at the end of this interception, in order to transmit the momentary voltages of this auxiliary member which being either integrated or opposed for the extreme values, provides a signal proportional to the dimension to be measured and representing the local dimension of the measured object.

Figure 9:
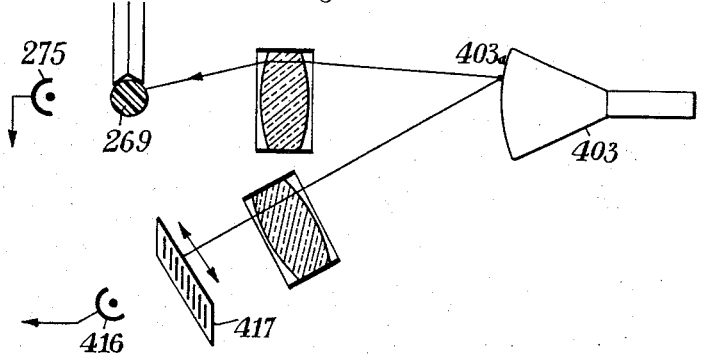
FIGURE 9 is a diagram showing an alternate embodiment of the means for producing an auxiliary reference signal.

Notably, the auxiliary continuous reference signal may result from the displacement of the member deflecting a blade or slit in front of an illuminated diaphragm of which the width or the local transparency is characterized by an adequate variation in a direction at right angles to this displacement, thus causing the transmission of a flux illuminating an auxiliary cell, this flux being proportional to the deflection of the light spot. The flux illuminating this blade or diaphragm may also be deflected by the deflection member by which the object to be measured is scanned. The same effect may also be obtained by driving the sliding contact of a potentiometer, the disc or plate of a variable capacitor, a coil in a variable magnetic coil, etc., the resulting signals, if they are alternating-current ones, being deflected and integrated. The spot of a cathode ray tube, notably of the one 403 (FIG. 9) producing a scanning light spot 403a may also—when it is transmitted by adequate screens—form in an auxiliary cell 416 or in the main cell these reference voltages which may be continuous or discontinuous, due to the introduction of a grid 417 on the scope screen or on its image, or of a diaphragm of variable local transparency or with as proposed hereinabove.

A discontinuous reference signal to be integrated or counted electrically may result from the displacement of a contactor along a row or series of conducting studs to produce a discontinuous current transmitted through a gate responsive to the photoelectric signal. This discontinuous signal may also be generated by a suitable magnetic recording caused to move past a series of projections constituting the opposite, comb-shaped electrode, by an electromagnet moving in front of a series of magnetic bodies, or by a plate or a disc (or their images) driven or deflected, at the same time and by the same members as the scanning light spot, in front of the diaphragm of an auxiliary cell producing the reference signal. More particularly, a disc formed with slots moving past the diaphragm of a cell of this character may be driven from the member causing the rotation of the light source, or of the lens for scanning the object by means of the light spot. The relative distances between the elements producing the discontinuous reference signals are such that their number is only subordinate to the divergence of the scanning light spot along the direction of measurement between the beginning and the end of its interception by the measured object.

In the devices contemplated herein the alteration of the limits of the measuring scales or ranges may be effected by changing the number of equispaced scanning spots, the sweep amplitude of the scanning light spot, the magnification of the optical system forming this spot, or by selecting through electron circuits only one portion of the continuous or discontinuous reference signals utilized in the apparatus. If, for example, this signal were proportional to time, a monostable multivibrator released at the beginning of the scanning cycle and of which the signal has an adequate and adjustable duration, makes it possible to suppress one portion of this signal and to transmit it only if its duration exceeds a predetermined value constituting the lower limit of the measuring range or scale. It is also possible to obtain a direct limitation of the amplitude of the reference signal as a function of its value if this amplitude does not vary uniformly as a function of time. In the specific case wherein the discontinuous but not isochronous pulses are "counted" a limiting counter makes it possible to eliminate a number of these pulses and to transmit only the following ones. These pulses may actuate this counter after it has been reset to zero, or another counter, to give a value proportional to the dimension of the measured object.

If a fixed and adjustable value or quantity is subtracted from the reference auxiliary signal, and notably from the number of pulses of a discontinuous signal, the difference with respect to the integrated signal corresponding to the local dimension represents the local overstepping of a predetermined limit of the dimension of the measured object. Its integrality produces the measurement of the "statistical overstepping." This effect may be obtained by limiting the amplitude of the pulse integrator which beyond only a certain amplitude value acts upon a gate ensuring the transmission of the referernce pulses exceeding a thus pre-adjusted fixed number.

Figure 2:
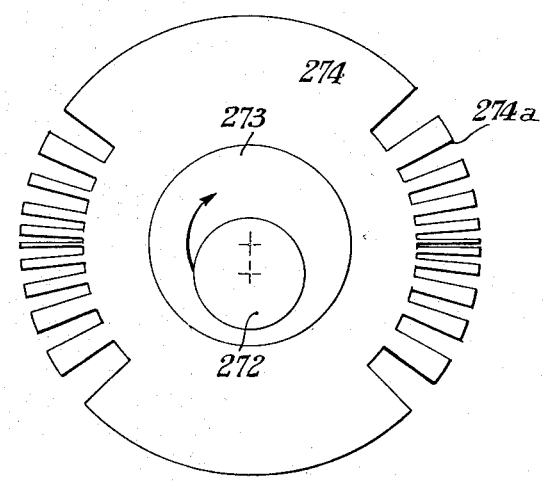
FIGURE 2 is an elevational view showing the slotted disc.
Figure 10:
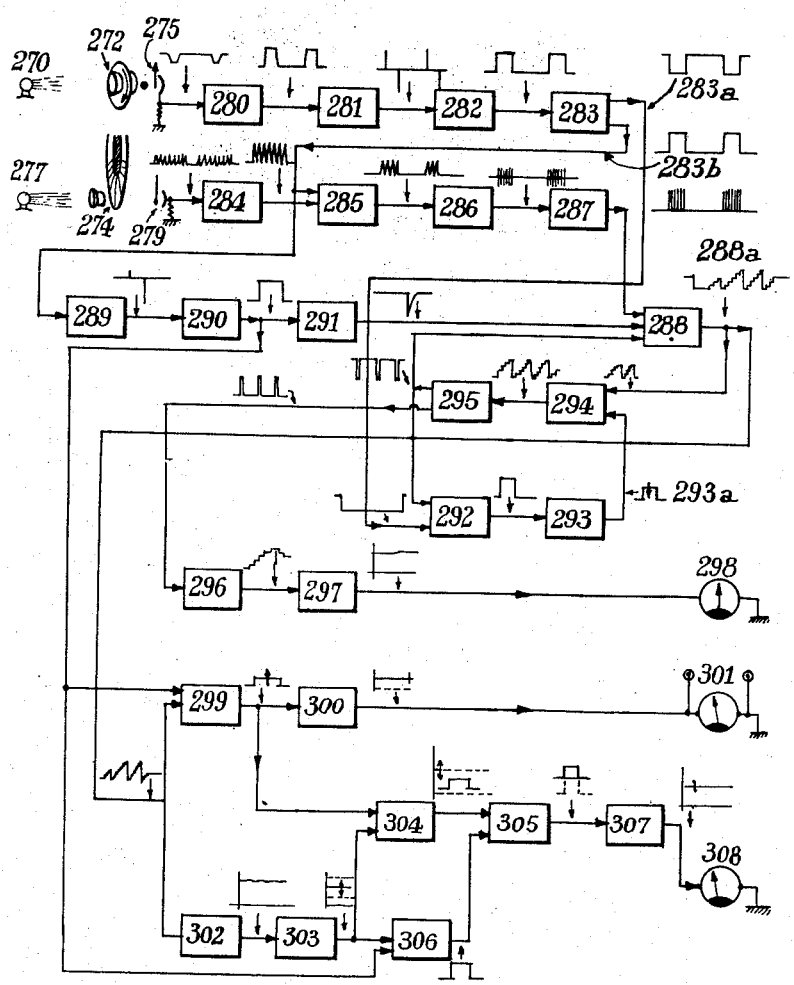
FIGURE 10 is a block diagram showing the principle on which the apparatus is based.
Figure 11:
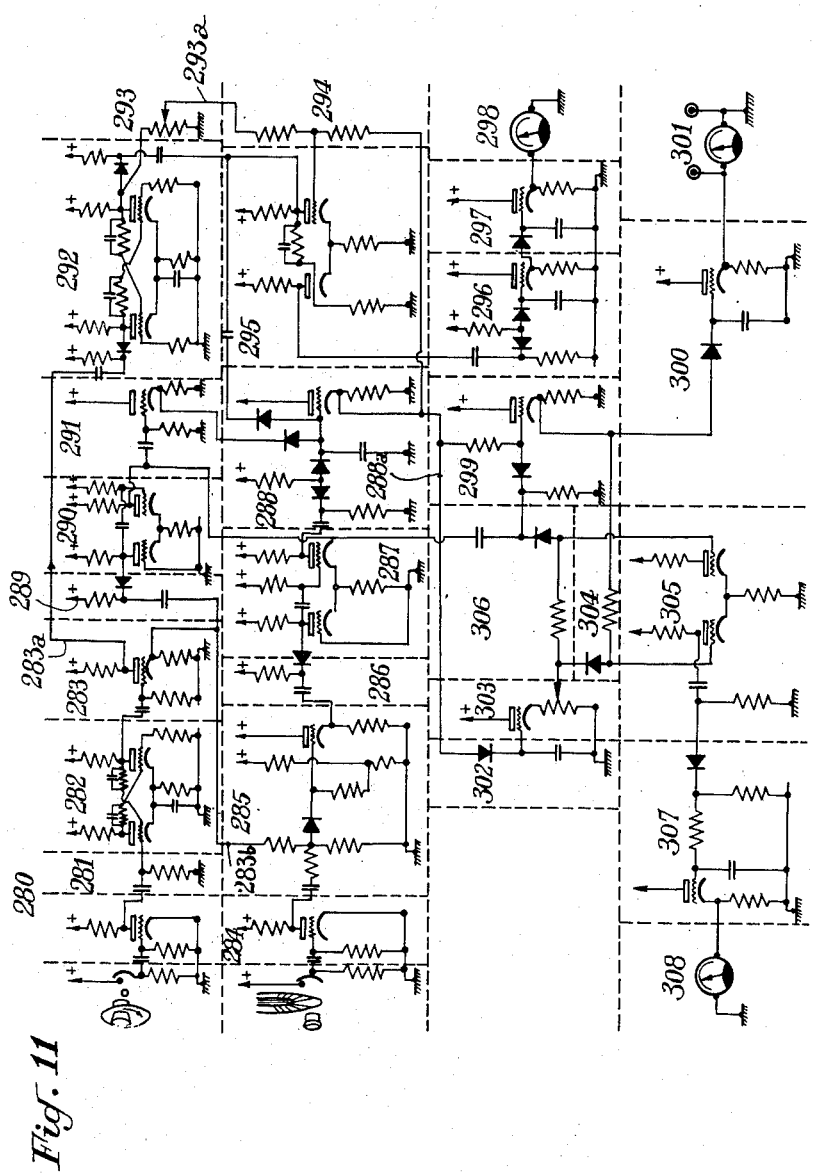
FIGURE 11 is a wiring diagram of the apparatus shown in FIG. 10.

The block-diagram illustrating the principle of the apparatus of FIGS. 1 and 2 is shown in FIG. 10 and the wiring diagram is shown in FIG. 11 wherein the portions surrounded by dotted lines correspond to those designated by the same reference numerals in FIG. 10. The shape of the output signals from the different parts of the assembly are indicated adjacent thereto.

The phtoelectric signal from cell 275 is amplified at 280 and differentiated at 281. The differentiated signals synchronize the bistable multivibrator 282 connected to an amplifier 283 delivering output signals of opposite signs 282a, 282b.

The signal from cell 279 is amplified at 284 and transmitted through a gate 285 responsive to the output signals 282b of 283. The pulses thus selected once or twice during each disc revolution are differentiated at 286 and synchronize a monostable multivibrator 287 producing pulses of fixed amplitude and duration. These pulses are integrated at 288 to yield a stepped signal 288a. The operation of this integrator 288 is further subjected to a limitation by two other circuits.

The first circuit includes the differentiator 289 for the signal 283b from 283, then a monostable multivibrator 290 producing a signal having a fixed and sufficient duration at the end of the signal 283, and finally the low time-constant differentiating circuit 291. The pulse produced in this circuit 291 at the end of the oscillation of 290 resets the voltage integrated at 288 so that this voltage during the existence of the pulse delivered by 290 will preserve the final value assumed thereby during the integration.

The other circuit acting upon 288 comprises a monostable multivibrator 292 actuated at the beginning of the scanning cycle by the output signal 283a from 283 of which the pulse amplitude may be adjusted manually in the circuit 293. The voltage 293a thus obtained acts upon the circuit 294 (thus providing an algebric addition of the input voltages) receiving on the other hand the integrated pulse 288a delivered by 288. In the absence of the first one of these voltages 293a, the circuit 295 constituting a Schmitt multivibrator resets the circuit 288 when the number of integrated pulses attains 10. Thus, the circuit 288 may be considered as constituting a "units" totalizer.

However, at the beginning of the scanning cycle the pulse produced at 292 and manually adjusted at 293 adds itself to the pulse from 288 to cause the release of 295 through the medium of 294 if a voltage lower than that corresponding to ten units is produced. Thus, it is possible by a manual adjustment to eliminate a number of units integrated in 287, with a view to "place" the measured dimension close to the middle of the scale of these "units." When this phenomenon has occurred a first time, 292 will not produce any oscillation and the resetting takes place only after a complete series of ten "units" has been totalized.

The output pulses (having two opposite signs) from 295 reperesent the tens of units and are integrated in the circuit 296 to produce a voltage proportional to the number of "tens." This voltage is transmitted through another, high time-constant circuit 297 and actuates the measuring instrument 298 indicating the "tens."

The "units" integrated voltage 288a issuing from 288 is fed to the gate 299 actuated by a monostable multivibrator 290. Thus, this gate transmits the final value of the voltage integrated in circuit 288 which represents the number of "units" during the fixed duration of one oscillation of 290. This voltage integrated in a high time-constant circuit 300 actuates the measuring instrument 301 indicating the "units."

The output voltage from 299, which represents the number of "units" corresponding to the local dimension, is opposed to a manually adjustable reference voltage to produce a measurement of the "statistical overstepping" by default. To this end the output voltage 288a from 288 actuates a peak detector 302 producing a direct-current voltage equal to the amplitude of ten "units" of the integrator 288. The manual adjustment circuit 303 makes it possible to take from this voltage an adjustable portion (which, due to the reference in relation to the "tens" voltage, may be indicated on the scale of a potentiometer in a fixed or permanent manner not subordinate to the feed voltages applied to the apparatus). This direct-current voltage is introduced into the amplitude limiter 304 preserving only that portion of the output voltage 299 which is lower than the thus determined limit. The resultant voltage is opposed electrically at 305 to the voltage from 303 which is transmitted through a gate 306 during the oscillation of 290. The two pulses thus opposed represent the difference (by default) between the local dimension and the pre-adjusted value. This voltage integrated in the high time-constant circuit 307 actuates the instrument 308 for measuring the "statistical overstepping."

The measuring instruments 298, 301 and 308 may be complemented by circuits ensuring the opposition of the voltages represented thereby with other voltages preadjusted for actuating switching relays according to the sign of their differences, these relays becoming operative for determining the adjustment constants in the manufacture of a cable either directly or through the medium of the measurement of the "statistical overstepping" and the assignment of the "standard" defining the mean diameter by means of a motor and a reduction gear.

A progressive indication of the dimensions lying between those corresponding to a whole number of auxiliary discontinuous signals may be obtained by cyclically varying the duration of the transmission of these signals through a gate so as to form an average thereof. This variation in the duration may be effected gradually during several successive scanning cycles from a monostable multivibrator released at each scanning cycle and of which the integration produces a stepped voltage which is subsequently reset to zero after a certain number of oscilations. This voltage should affect the duration of the transmisison through a gate of the auxiliary signals. This may be obtained by releasing, by means of the end of the signal from the monostable multivibrator of the preceding circuits, another monostable multivibrator of which the duration is affected by the aforesaid integrated voltage so as to extend its action. The same effect may also be obtained by introducing a circuit having a sufficient time constant to cause the signal from the monostable multivibrator to occur only gradually. This signal is electrically added to the aforesaid integrated signal and causes the synchronization of a Schmitt monostable multivibrator of which the oscillation time varies as a function of the integrated voltage and which, instead of the bistable multivibrator, releases the gate transmitting the reference signals. The number of these signals will thus vary cyclically and the mean integrated value represents a progressive statistical measure.

A typical example of an electrical circuit suitable for providing a progressive indication of the values of the measured dimension, which lie between those corresponding to a whole number of cycles of the photoelectric signal from 279 is illustrated in FIGS. 12 and 13. This circuit is interposed between the element 283 on the one hand and the elements 292, 285 and 289 on the other hand, as shown in FIGS. 10 and 11.

This circuit comprises a bistable multivibrator 309 synchronized by the output signal 283b from 283 but of which the charge is progressive due to the high time-constant of its circuit. On the other hand the output signal 283b from 283 synchronizes the monostable multivibrator 310. Upon each revolution of the disc the pulse from this multivibrator is integrated in the circuit 311. The integrated voltage synchronizes a Schmitt multivibrator 312 which resets 311, the amplitude of the stepped voltage thus produced being of the order of that of the pulse from the multivibrator 309. This voltage is added to that of 309 at 313 and synchronizes the Schmitt multivibrator 314. The latter creates two signals of opposite polarity of which the duration varies as a function of the momentary level of the stepped voltage issuing from 311, the total variation corresponding to the time elapsing in the average between the two successive photoelectric reference signals. These signals are fed on the one hand to the monostable multivibrator 292 and on the other hand the gate 285 and the differentiating circuit 289. Under these conditions the indication of the local dimension is subjected to one-"unit" variations in the reference voltage at a frequency depending gradually on the duration of the oscillation delivered by circuit 283; therefore, the mean value of the resulting measure represents in a progressive manner the real dimension of the measured object.

Although I have described my invention with a certain degree of particularity, it is understood that the present disclosure has been made only by way of example since numerous changes in the details of construction and the combination and relative arrangement of parts may be resorted to without departing from the spirit and scope of the invention as hereinafter claimed.

What I claim is:

1. An apparatus for measuring the transverse dimension of an object of elongated shape such as a cable, tube wire, tape, comprising in combination an emitter of a radiant beam and a photoelectric receiver for said beam, said object being placed between said emitter and receiver, means for forming from said beam issuing from said emitter at least one narrow luminous zone, said narrow luminous zone and the object to be measured constituting two elements, an optical system for forming the image of one of said elements on the other element, means for producing a periodic relative displacement of the image of one of said elements with respect to the other so as to periodically block the image of one of said elements by means of the other element and therefore periodically break the current delivered by said photoelectric receiver, means for producing an auxiliary reference signal varying in proportion to the relative displacement, in the direction of the measurement, of the image of one of the elements with respect to the other, the means producing said auxiliary signal being driven in synchonism with the means producing the relative displacement of the image of one element in relation to the other, and means for producing from the variation of said auxiliary reference signal during the time period in which said photoelectric current is discontinued, an output voltage giving an indication proportional to the transverse dimension of the measured object.

2. Apparatus as set forth in claim 1, comprising means for forming the mean value of the output voltage and thus produce a voltage proportional to the mean dimension of the measured object.

3. An apparatus as set forth in claim 1, comprising means for determining the mean value of the output voltage and producing a voltage proportional to the average dimension of the measured object, an adjustable circuit adapted to determine the difference between the voltage representing the mean value of the dimension of the measured object and a first preadjusted voltage corresponding to a requisite dimension, called "standard" of said mean dimension, in order to form a first differential resultant voltage adapted to control a machine producing the measured object with a view to keep said last-named mean dimension to a fixed value equal to said "standard," means for transmitting said output voltage only when its value exceeds a preadjusted limit value, other means for determining the average value of the voltage thus transmitted in order to constitute a voltage proportional to the statistical overstepping of the dimension of the measured object in relation to a preadjusted value thereof which corresponds to said limit voltage, means for opposing the voltage proportional to said statistical overstepping to another preadjusted voltage defining a requisite value called "standard" of said statistical overstepping and producing another differential resultant voltage, and means responsive to said other differential resultant voltage for effecting the variaion in the adjustment of the "standard" of said mean dimension so as to keep to a fixed value equal to its "standard" the value of the statistical overstepping of the measured object during its manufacture.

4. Apparatus according to claim 1, comprising, a gate for transmitting said auxiliary reference signal, means for opening said gate during a short time period at the beginning and at the end of the time period in which said photoelectric current is discontinued, and means for transforming the variation of the auxiliary reference signal between the beginning and the end of said time period into an indication of the local dimension of the measured object.

5. Apparatus according to claim 1, comprising means for integrating the differences in the auxiliary reference signal transmitted between the beginning and the end of the time period in which said photoelectric current is discontinued.

6. Apparatus according to claim 1, comprising means for subtracting from said output voltage an adjustable reference voltage corresponding to a pre-adjusted value of the dimension of the object to be measured, and means for integrating the difference of these voltages so as to give an indication of the statistical overstepping of said dimension with respect to said pre-adjusted value.

7. Apparatus according to claim 1, comprising means for generating a discontinuous auxiliary reference signal having the form of a series of elementary pulses of which the number increases as a function of the displacement of the image of one of said elements in relation to the other element, and means for totalizing the number of elementary pulses produced from the beginning to the end of the time period in which said photoelectric current is discontinued.

8. Apparatus according to claim 7, comprising an auxiliary photoelectric cell, a light source illuminating said cell, means for periodically breaking the light flux received by said auxiliary photoelectric cell, said last-named means being driven in synchronism with the means causing the displacement of the image of one of the elements in relation to the other element, whereby the number of elementary pulses constituting the auxiliary reference signal is only a function of the difference in the relative positions of said elements between the beginning and the end of the time period in which said photoelectric current is discontinued.

9. Apparatus according to claim 7, comprising a gate transmitting the elementary pulses, a first bistable multivibrator controlling the opening of said gate as a function of the photoelectric current, and means for cyclically and gradually modifying during several cycles the duration of the oscillation of the bistable multivibrator in order to supply a progressive mean indication of the dimension of the object.

10. Apparatus according to claim 7, comprising means for selecting the transmission of only one portion of the auxiliary reference signal.

11. Apparatus according to claim 1, comprising to least one fixed diaphragm disposed in front of the photoelectric receiver and defining the limits of the flux received by said receiver, means for projecting the image of the object to be measured onto said diaphragm, means for causing the periodic displacement of said image on said diaphragm so that said image will cross said diaphragm completely, and means for measuring the difference in the relative positions of the image of said object in relation to the diaphragm, at which said time period in which said photoelectric current is discontinued commences and ends, and giving as a function of this difference an indication of the measure of the transverse dimension of the object.

12. Apparatus according to claim 1, comprising means for producing at least one narrow light spot, means for periodically displacing said narrow light spot so as to cause it to be intercepted by said object, and means for measuring the difference between the relative positions of said narrow light spot, with respect to the object, at which said time period in which said photoelectric current is discontinued commences and ends, and giving as a function of this difference an indication of the measure of the transverse dimension of said object.

13. Apparatus according to claim 12, comprising a cathode ray tube of the flying spot type of which the spot forms a beam for scanning the object, and means for opposing the instantaneous values of the deflection voltages of said cathode ray tubes between the beginning and the end of the time period in which said photoelectric current is discontinued and therefore providing a resultant voltage proportional to the dimension of the object being measured.

14. Apparatus according to claim 12, comprising a rotary member, an optical system eccentrically mounted in relation to the axis of rotation of said member and adapted to form in the plane of one of the elements the image of the other element, an auxiliary photoelectric cell, a light source illuminating said auxiliary photoelectric cell and a series of zones having a variable transparence in said rotary member, said zones passing through the path of the light flux received by said auxiliary photoelectric cell to produce auxiliary signals serving for the measurement of the dimension of said object.

References Cited in the file of this patent

UNITED STATES PATENTS

| | | |
|---|---|---|
| 2,193,606 | Ulrey | Mar. 12, 1940 |
| 2,251,613 | Kott | Aug. 5, 1941 |
| 2,750,834 | Golay | June 19, 1956 |
| 2,769,922 | Peery | Nov. 6, 1956 |
| 2,818,172 | Mills | Dec. 31, 1957 |
| 2,895,373 | Eyraud | July 21, 1959 |
| 3,017,801 | Ingber | Jan. 23, 1962 |